United States Patent [19]
Hashimoto

[11] Patent Number: 6,103,808
[45] Date of Patent: *Aug. 15, 2000

[54] HIGH AROMATIC OIL AND RUBBER COMPOSITION AND OIL EXTENDED SYNTHETIC RUBBER USING THE SAME

[75] Inventor: Takatsugu Hashimoto, Kodaira, Japan

[73] Assignee: Bridgestone Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/930,351
[22] PCT Filed: Jun. 27, 1997
[86] PCT No.: PCT/JP97/02244
§ 371 Date: Sep. 30, 1997
§ 102(e) Date: Sep. 30, 1997
[87] PCT Pub. No.: WO97/35462
PCT Pub. Date: Oct. 2, 1997

[51] Int. Cl.$^7$ ................. C07C 7/10; C08L 21/00
[52] U.S. Cl. ............ 524/484; 208/314; 208/322; 208/309; 585/319; 585/804
[58] Field of Search ............ 524/484; 208/309, 208/314, 322; 585/804, 319

[56] References Cited

U.S. PATENT DOCUMENTS 3,546,093  12/1970  Wentzheimer et al. ............. 524/484
4,925,894  5/1990  Futamura et al. ............. 524/484
5,034,119  7/1991  Blackburn et al. ............. 208/309
5,242,579  9/1993  Mead et al. ............. 208/322
5,336,840  8/1994  Forte ............. 585/804
5,504,135  4/1996  Ardrizzi et al. ............. 524/484

FOREIGN PATENT DOCUMENTS 52-47941   9/1976   Japan .
434978    12/1987   Japan .
583529    12/1987   Japan .
WO9735462 10/1997   WIPO .

OTHER PUBLICATIONS

APS Search "IP 346", Mar. 8, 1999.

*Primary Examiner*—Andrew E. C. Merriam
*Attorney, Agent, or Firm*—Sughrue, Mion, Zinn, Macpeak & Seas, PLLC

[57] ABSTRACT

The high aromatic oil provided in the present invention is characterized by that a glass transition point is −45 to −20° C. and an aromatic component measured by Clay-Gel method accounts for 55 to 90% by weight and that a polycyclic aromatic compound measured by IP 346 method accounts for less than 3% by weight based on the whole components of hydrocarbons contained in the oil.

This high aromatic oil can suitably be used for various rubber compositions such as tires, rubber vibration insulators and fenders, oil extended synthetic rubbers, printing inks and writing inks.

8 Claims, 4 Drawing Sheets

FIG.1

REFINING PROCESS FOR HIGH AROMATIC OIL

HIGH AROMATIC OIL AND RUBBER COMPOSITION AND OIL EXTENDED SYNTHETIC RUBBER USING THE SAME

This application is a National Stage application which claims priority under 35 USC sec. 371 to International application PCT/JP97/02244, filed on Jun. 27, 1997.

TECHNICAL FIELD

The present invention relates to a high aromatic oil preferably used for various rubber products, such as tires, rubber vibration insulators and fenders, printing inks and writing inks, and a rubber composition and an oil extended synthetic rubber using this high aromatic oil, specifically to such an improved high aromatic oil that the product performances thereof are compatible with an environment, and a rubber composition and an oil extended synthetic rubber using said high aromatic oil.

BACKGROUND ART

In general, paraffinic and naphthenic oils and high aromatic oils have so far been used as a softening agent for a rubber composition and as an extender oil for a synthetic rubber, and they have been used properly depending on the uses thereof. In particular, high aromatic oils have preferably been used as a softening agent for a rubber composition and as an extender oil for a synthetic rubber because of the following reasons (1) to (4):

(1) high aromatic oils have a characteristic of giving a high loss performance (high heat generating property) to a rubber composition, (2) an affinity thereof with a rubber component, which is natural rubber or synthetic rubber, contained in a rubber composition, is the best, (3) high aromatic oils have a softening characteristic for improving the workability of a rubber composition, and (4) the profitability is excellent (inexpensive).

It has been advised, however, in PROPOSITION-65 enforcement in 1988 and a series of EU instructions started in 1989 that the high aromatic oils have a possibility to be a carcinogen because of polycyclic aromatic compounds [hereinafter, called a DMSO extract or PCA (polycyclic aromatic compounds) contained as components in the high aromatic oils, and therefore a high aromatic oil having no problem from the viewpoint of safety and hygiene as well as the characteristics (1) to (4) described above has been desired.

Following the series of regulations described above, in particular, the EU instructions, several proposals have so far been made from the viewpoint of a rubber composition. At present, however, any high aromatic oils which satisfy the three required characteristics described above and concurrently are adequate from the safety and hygiene point of view have not yet been proposed, much less rubber compositions or oil extended synthetic rubbers using said high aromatic oil.

A synthetic rubber obtained by using, as an aromatic monomer, a high aromatic lubricant which has a viscosity of 32 to 50 cst and which contains an aromatic component of 30 to less than 55% by weight and a saturated hydrocarbon component of 40 to 65% by weight, both of which are measured by Clay-Gel method (ASTM D 2007), and a polycyclic aromatic compound (PCA) of less than 3% by weight measured according to IP (The Institute of Petroleum) 346 method (PCA standard test) which is a method of extracting oil into dimethylsulfoxide as a means of determining polycyclic aromatic compound content, in particular, a rubber composition obtained by using the above lubricant for SBR in a proportion of 10 to 25% by weight based on the whole weight of the rubber composition has been proposed in, for example, Japanese Patent Application Disclosure No. Hei 6-505524 [British Patent (GB) 2252978, U.S. Pat. No. 5,504,135 and European Patent (EP) 575400].

The viscosity of the high aromatic oil, however, does not have a relation to the characteristic of providing either the high loss performance or the affinity with rubber among the characteristics required to the performances of the high aromatic oils described above and is not univocally related as well to the softening characteristic. In addition, there is the problem that the high aromatic oil can not stand the use as an alternative for conventional high aromatic oils, because the aromatic component falling within the above range, measured by the Clay-Gel method, does not provide the sufficiently high loss performance and the saturated hydrocarbon component falling within the above range does not provide as well the sufficient affinity with rubber.

Further, a method for solving a inferior high loss performance of a high aromatic oil containing less polycyclic aromatic compound (PCA) by making use of an cumaron-indene resin is proposed in West Germany Patent (DE) 3938620 [European Patent (EP) 429761, U.S. Pat. No. 5,091,007 and East Germany Patent (DD) 299193]. This method, however, has problems that the profitability is very bad and that the affinity with rubber is low since the amount of an aromatic component contained in the oil used is as small as 0 to 30% by weight, and therefore the practicability is poor.

Thus, conventional methods are in a state that performances, profitability and safety and hygiene can not stand together, and therefore the development of a novel high aromatic oil satisfying all of performances, profitability and safety and hygiene has strongly been desired.

DISCLOSURE OF THE INVENTION

Outline of the Invention:

An object of the present invention is to provide an improved high aromatic oil used for various rubber products such as tires, rubber vibration insulators and fenders, printing inks and writing inks, which gives a rubber composition containing the high aromatic oil the conventional levels of performances required to a rubber composition and contains polycyclic aromatic compounds (PCA) of less than 3% by weight measured by the IP 346 method based on the EU instructions, and which provides a rubber composition at low cost, and to provide a rubber composition and an oil extended synthetic rubber each using the high aromatic oil.

Taking such circumstances into consideration, the present inventor has intensively investigated what high aromatic oil containing polycyclic aromatic compounds (PCA) of less than 3% by weight measured by the IP 346 method, has the same performances as those of a conventional high aromatic oil and is obtainable within the industrially reasonable range. Finally, he has found that only a high aromatic oil having a glass transition point and an aromatic component measured by the Clay-Gel method both falling within the restricted ranges can allow the intended performances, the profitability and the safety and hygiene to stand together, and thus have come to complete the present invention.

That is, the present invention resides in the following (1) to (6):

(1) An improved high aromatic oil of which a glass transition point is −45 to −20° C. and an aromatic component measured by the Clay-Gel method accounts for 55 to 90% by weight and of which a polycyclic aromatic compound measured by the IP 346 method accounts for less than 3% by weight based on the whole components of hydrocarbons contained in the oil.

(2) The high aromatic oil as described in the above (1), wherein the high aromatic oil has an aniline point of 97 or less.

(3) The high aromatic oil as described in the above (1) or (2), wherein the saturated hydrocarbon component measured by the Clay-Gel method accounts for 40% by weight or less.

(4) A rubber composition obtained by compounding the high aromatic oil as described in any of the above (1) to (3) into a rubber component comprising natural rubber and/or a synthetic rubber, wherein said high aromatic oil is blended in a proportion of 0.2 to 50% by weight based on the whole weight of the rubber composition.

(5) An oil extended synthetic rubber obtained by adding the high aromatic oil as described in any of the above (1) to (3) to a solution or a dispersion of a synthetic rubber in a proportion of 5 to 50% by weight based on the whole weight of the synthetic rubber and then subjecting to desolvent treatment.

(6) A rubber composition obtained by using the oil extended synthetic rubber as described in the above (5).

BEST MODE FOR CARRYING OUT THE INVENTION

Best Mode of the High Aromatic Oil:

The improved high aromatic oil of the present invention is characterized by that the glass transition point is −45 to −20° C. and the aromatic component measured by the Clay-Gel method accounts for 55 to 90% by weight and that the polycyclic aromatic compound measured by the IP 346 method accounts for less than 3% by weight based on the whole components of hydrocarbons contained in the oil.

In the present invention, the DMSO extract measured by the IP 346 method has to account for less than 3% by weight, preferably 0.5 to 3.0% by weight based on the whole weight of a sample used for the test.

The DMSO extract of 3.0% by weight or more is contrary to the EU instructions because of a risk for a carcinogen and therefore is not preferred.

Further, the glass transition point of the high aromatic oil measureed by DSC has to be −45 to −20° C., preferably −42 to −25° C. and more preferably −40 to −28° C.

The glass transition point of less than −45° C. does not provide with a characteristic to give a sufficiently high loss performance to the rubber composition and concurrently changes the elasticity of the rubber composition to a large extent. Accordingly, it is not preferred. Further, the glass transition point exceeding −20° C. can not maintain the excellent low temperature characteristic of a rubber composition and therefore is not preferred.

Further, the aromatic component of the high aromatic oil of the present invention measured by the Clay-Gel method has to account for 55 to 90% by weight, preferably 60 to 85% by weight and more preferably 65 to 80% by weight.

The aromatic component accounting for less than 55% by weight does not provide a high aromatic oil with a characteristic to give a sufficiently high loss performance to the rubber composition and concurrently does not give a sufficiently good rupture characteristic to the rubber composition. Meanwhile, the aromatic component exceeding 90% by weight makes it markedly difficult to maintain the polycyclic aromatic compounds (PCA) measured by the IP 346 method at less than 3% by weight, and as a result, the profitability at a refining step for the high aromatic oil is notably decreased. Accordingly, both are not preferred.

In the case of the improved high aromatic oil of the present invention, the aniline point is preferably 97 or less, further preferably 90 or less. It falls more preferably within the range of 10 to 85, particularly preferably 15 to 75.

The aniline point exceeding 97 deteriorates the affinity of the high aromatic oil with a rubber component contained in the rubber composition and results in being liable to cause oil bleed. Accordingly, it is not preferred. Meanwhile, the aniline point of less than 15 makes it difficult to maintain the polycyclic aromatic compounds (PCA) measured by the IP 346 method at less than 3% by weight, and as a result, the profitability at a refining step for the high aromatic oil is decreased.

Further, the saturated hydrocarbon component measured by the Clay-Gel method accounts for 40% by weight or less, preferably 35% by weight or less and more preferably 25% by weight or less.

The saturated hydrocarbon component exceeding 40% by weight deteriorates the affinity of the high aromatic oil with the rubber component contained in the rubber composition and results in being liable to cause oil bleed. Accordingly, it is not preferred.

In addition to the characteristics described above, the high aromatic oil of the present invention further preferably has the following characteristic so as to be suitably used as a softening agent or an extender oil for rubber.

That is, the high aromatic oil of the present invention has preferably a kinetic viscosity of 70 cst or less at 100 degree centigrade.

The kinetic viscosity exceeding 70 cst degrades the workability when the high aromatic oil is used for a rubber composition as a softening agent and for a synthetic rubber, and concurrently does not provide a sufficiently high softening performance as a softening agent for a rubber composition. The kinetic viscosity falls more preferably within the range of 10 to 32 cst from the viewpoint of a softening performance.

For the high aromatic oil of the present invention, the following various specific refining methods (1) to (6) which have so far been proposed can be used as a production process for embodying the properties and compositions described above:

(1) a method in which devised are the refining conditions of a vacuum distillation residual oil originally containing less DMSO extract measured by the IP 346 method, particularly the conditions of deasphalting and the following solvent extraction, disclosed in U.S. Pat. Nos. 5,178,747 and 5,034,119, (2) a method in which water and carbon dioxide are used for deasphalting of a vacuum distillation residual oil originally containing less DMSO extract measured by the IP 346 method, disclosed in West Germany Patent (DE) 4038458 and in European Patent (EP) 48937, (3) a method of extracting a vacuum distillation residual oil with a solvent to produce a lubricant containing less PCA, disclosed in U.S. Pat. Nos. 5,178,750 and 5,242,579, (4) a method in which a high aromatic lubricant is subjected plural times to solvent extraction treatment, disclosed in European Patent (EP) 417980, (5) a method in which a high aromatic lubricant is subjected to alkylation treatment, disclosed in World Patent (WO) 9411325 and Japanese Patent Application Disclosure No. Hei 8-503215, and (6) a method of refining a high aromatic lubricant by an air oxidation reaction, disclosed in World Patent (WO) 9528458 and Australian Patent (AU) 9522092.

A method in which a tumor cancer-generating topped light hydrocarbon oil having a boiling point falling within the range of 250 to 780° F. is blended with a non-tumor cancer-generating vacuum distilled hydrocarbon oil, disclosed in Japanese Patent Application Laid-open No. Hei 6-41558 is proposed as a method of obtaining a non-carcinogenic light lubricant for industries. It is, however, substantially a light lubricant, and though the above method is close to the refining method in the present invention, it can not be applied for a high aromatic lubricant as it is.

The high aromatic oil of the present invention can be produced not only by the methods described in the respective known literatures but also by methods generally used for refining lubricants, that is, by subjecting a fraction obtained by distilling naphthenic and/or paraffinic crude oils at the atmospheric pressure and at a reduced pressure to one of refining methods, such as solvent extraction treatment, hydrogenation treatment, dewaxing treatment and deasphalting treatment or two or more kinds thereof suitably in combination, or it can be produced as well by blending two or more oils obtained by such methods.

The solvent extraction treatment described above means an operation for separating a crude oil into a raffinate having less aromatic content and an extract having more aromatic content by using a solvent. Used as the solvent are, for example, furfural, phenol, cresol, sulfolane, N-methylpyrrolidone, dimethylsulfoxide, formylmorpholine and glycolic solvents.

A separative power in the solvent extraction treatment is varied depending on the solvent used, the crude oil/solvent ratio and the reaction temperature applied. Accordingly, PCA can selectively be separated by suitably changing these conditions.

The hydrogenation treatment described above is an oil refining process intended for decomposing sulfur, nitrogen, oxygen and metal compounds contained in the fraction in order to remove them and for reforming or cracking hydrocarbons. Examples of the catalyst used for the hydrogenation treatment include catalysts obtained by using a metal such as Ni, W, Pt and Pd or a metal oxide of Mo, Co, Ni or W as a metal component, and alumina, silica, silica-alumina or zeolite as a carrier. Further, the hydrogenation treatment is classified broadly into a hydrogenation finishing treatment carried out under relatively mild reaction conditions and hydrocracking treatment carried out under severe conditions. Further, it is possible to selectively crack only PCA by changing the conditions of the hydrocracking treatment.

Further, the dewaxing treatment described above is intended for removing a wax component contained in the fraction, and an MEK dewaxing method and a propane dewaxing method are known.

The deasphalting treatment described above is a process for removing an asphalt component and a resinous component particularly contained in a vacuum distillation residual oil, and low molecular weight hydrocarbons having 1 to 5 carbon atoms are used as a solvent. Propane alone and a mixture of propane and butane are used as an optimum solvent.

The high aromatic oil of the present invention can be produced by suitably combining the methods described in the respective known literatures described above with the respective refining methods described above, and it is a matter of course that the treating conditions have to be settled so as to satisfy the respective properties described above.

The solvent extraction treatment and hydrocracking treatment described above can easily control the contents of the aromatic components and PCA contained in the fraction, and therefore they are preferably used for producing the high aromatic oil of the present invention.

As described above, the high aromatic oil of the present invention can be produced by using the respective methods described above alone or in combination of a plurality thereof, and the following processes (refining methods) 1 to 13 are preferably used in order to satisfy the performances, the profitability and safety and hygienic requirement together.

Figure 1:
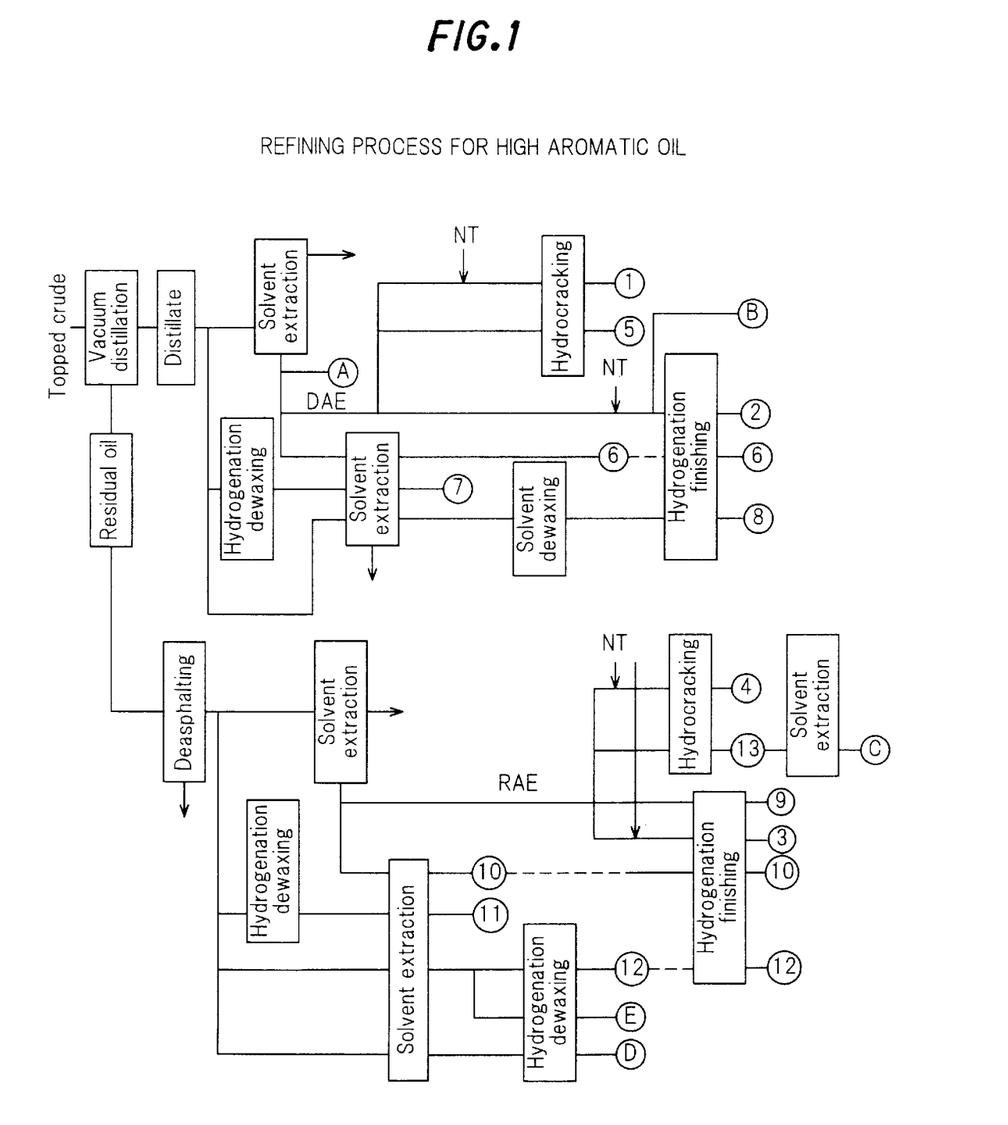
FIG. 1 is a flow chart showing a production process of a refining method (procedure) for a high aromatic oil of the present invention.

FIG. 1 shows the following processes (refining methods) 1 to 13 and the production processes of A to E, and 1 to 13 and A to E in the drawing show the respective processes (refining methods).

NT described in the following processes in FIG. 1 and in the tables means a product obtained by subjecting a raffinate having a low aromatic content obtained by subjecting a vacuum distillation distillate to solvent extraction treatment to hydrogenation finishing treatment and/or solvent dewaxing treatment, and includes a paraffinic oil and a naphthenic oil.

Process 1:

NT is added to an extract having a high aromatic content obtained by subjecting a vacuum distillation distillate to solvent extraction treatment, and the extract is then subjected, if necessary, to hydrocracking treatment under the condition that only PCA is selectively cracked.

Process 2:

NT is added to an extract having a high aromatic content obtained by subjecting a vacuum distillation distillate to solvent extraction treatment, and the extract is then subjected, if necessary, to hydrogenation finishing treatment under the condition that only PCA is selectively cracked.

Process 3:

NT is added to an extract having a high aromatic content obtained by subjecting a vacuum distillation residual oil to deasphalting treatment and further to solvent extraction treatment, and the extract is then subjected, if necessary, to hydrogenation finishing treatment under the condition that only PCA is selectively cracked.

Process 4:

NT is added to an extract having a high aromatic content obtained by subjecting a vacuum distillation residual oil to deasphalting treatment and further to solvent extraction treatment, and the extract is then subjected, if necessary, to hydrocracking treatment under the condition that only PCA is selectively cracked.

Process 5:

A vacuum distillation distillate is subjected to solvent extraction treatment to obtain an extract having a high aromatic content. The extract thus obtained is then subjected to hydrocracking treatment under the condition that PCA is selectively cracked.

Process 6:

A vacuum distillation distillate is subjected to solvent extraction treatment to obtain an extract having a high aromatic content. The extract thus obtained is further subjected to solvent extraction treatment under the condition that PCA is selectively seperated to obtain a raffinate having a high aromatic content and a low PCA content. The raffinate thus obtained is subjected to hydrogenation finishing treatment, if necessary.

Process 7:

A vacuum distillation distillate is subjected to hydrogenation dewaxing treatment. Subsequently, the oil thus obtained is subjected to solvent extraction treatment under the condition that PCA is selectively separated to obtain a raffinate having a low PCA content.

Process 8:

A vacuum distillation distillate is subjected to solvent extraction treatment under the condition that PCA is selectively separated to obtain a raffinate having a low PCA content. The raffinate thus obtained is subjected to solvent dewaxing treatment and further to hydrogenation finishing treatment.

Process 9:

An extract having a high aromatic content obtained by subjecting a vacuum distillation residual oil to deasphalting treatment and further to solvent extraction treatment is subjected to hydrogenation finishing treatment, if necessary.

Process 10:

A vacuum distillation residual oil is subjected to deasphalting treatment and further to solvent extraction treatment to obtain an extract having a high aromatic content. The extract thus obtained is further subjected to solvent extraction treatment under the condition that PCA is selectively separated to obtain a raffinate having a high aromatic content and a low PCA content. The raffinate thus obtained is subjected to hydrogenation finishing treatment, if necessary.

Process 11:

A vacuum distillation residual oil is subjected to deasphalting treatment and further to hydrogenation dewaxing treatment. Subsequently, the oil thus obtained is subjected to solvent extraction treatment under the condition that PCA is selectively separated to obtain a raffinate having a low PCA content.

Process 12:

A vacuum distillation residual oil is subjected to deasphalting treatment and further to solvent extraction treatment under the condition that PCA is selectively separated to obtain a raffinate having a low PCA content. The raffinate thus obtained is subjected to solvent dewaxing treatment and further, if necessary, to hydrogenation finishing treatment.

Process 13:

A vacuum distillation residual oil is subjected to deasphalting treatment and further to solvent extraction treatment to obtain an extract having a high aromatic content. The extract thus obtained is then subjected to hydrocracking treatment under the condition that PCA is selectively cracked.

Process A:

A vacuum distillation distillate is subjected, if necessary, to dewaxing treatment and then to solvent extraction treatment to obtain an extract having a high aromatic content.

Process B:

A paraffinic or naphthenic fraction subjected to hydrogenation finishing and/or dewaxing treatment is added to an extract having a high aromatic content obtained by subjecting a vacuum distillation distillate to solvent extraction treatment.

Process C:

A vacuum distillation residual oil is subjected to deasphalting treatment and further to solvent extraction treatment to obtain an extract having a high aromatic content. The extract thus obtained is then subjected to hydrocracking treatment under the condition that PCA is selectively cracked. Further, the cracked product is treated with DMSO, and then subjected to solvent extraction operation repeatedly three times while varying the amount of furfural and the temperature condition.

Process D:

A vacuum distillation residual oil subjected to deasphalting treatment is subjected to solvent extraction and solvent dewaxing treatment.

Process E:

A vacuum distillation residual oil subjected to deasphalting treatment is subjected to solvent extraction and solvent dewaxing treatment.

Next, the rubber composition and the oil extended synthetic rubber of the present invention are characterized by using the high aromatic oil having the characteristics and properties described above, and the blend amounts and use amounts thereof are as follows.

(1) The high aromatic oil having the characteristics described above is desirably blended into the rubber composition in a proportion of 0.2 to 50% by weight, preferably 0.5 to 40% by weight and more preferably 1 to 35% by weight based on the whole weight of the rubber composition.

If the proportion of the high aromatic oil having the characteristics described above is less than 0.2% by weight based on the whole weight of the rubber composition, the softening characteristic is inferior. Meanwhile, if the proportion exceeds 50% by weight, adhesion to a roll and the like becomes heavy, and the workability is reduced. Accordingly, both are not preferred.

(2) The high aromatic oil-extended synthetic rubber is prepared desirably by using the high aromatic oil in a proportion of 5 to 50% by weight, preferably 10 to 40% by weight and more preferably 12 to 38% by weight based on the whole weight of the synthetic rubber.

There can be used as the synthetic rubber, for example, styrene-butadiene copolymers (SBR), polybutadiene (BR), polyisoprene (IR), polychloroprene (CR), ethylene-propylene-diene ternary copolymers (EPDM), acrylonitrile-butadiene rubber (NBR) and butyl rubber (IIR).

If the proportion of the high aromatic oil having the characteristics described above is less than 5% by weight based on the whole weight of the synthetic rubber, the tackiness of the rubber is deteriorated, and it becomes difficult to prepare a bale therefrom. Meanwhile, if the proportion exceeds 50% by weight, adhesion between rubbers or between rubber and a press becomes heavy, and it becomes difficult as well to prepare a bale. Accordingly, both are not preferred.

A method of using the high aromatic oil for the rubber composition may be either in the form of an oil as it is or in the form of the high aromatic oil-extended synthetic rubber. Further, the following compounds as well as the high aromatic oil described above are blended into the rubber composition of the present invention.

(a) Natural rubber (NR) or synthetic rubber (SBR, BR, IR, CR, EPDM, NBR, IIR and the like) and a mixture thereof.

(b) Reinforcing agent such as carbon black and silica of 20 to 150 parts by weight, preferably 25 to 120 parts by weight and more preferably 30 to 105 parts by weight per 100 parts by weight of a rubber component comprising natural rubber, synthetic rubber or a mixture thereof, which is component (a) described above.

(c) Cross-linking agent and cross-linking auxiliary

The rubber composition of the present invention can be obtained by adding cross-linking agent and cross-linking auxiliary (c) described above to a mixture composed of three components of component (a) and (b) and the high aromatic oil of the present invention and heating this blended matter to cure. In this case, any compounds such as organic peroxides, sulfur and organic sulfur compounds as the cross-linking agent, and thiazole compounds and guanidine compounds as the cross-linking auxiliary can be used as long as they can usually be used for rubbers.

Further, the following optional components in addition to the respective components described above can be added to the rubber composition of the present invention.

(d) An inorganic filler of 5 to 200 parts by weight, preferably 25 to 120 parts by weight and more preferably 32 to 105 parts by weight per 100 parts by weight of the rubber component comprising natural rubber, synthetic rubber and/ or a mixture thereof, which is component (a) described above. In this case, the inorganic filler includes calcium carbonate, magnesium carbonate, clay, alumina, aluminum hydroxide, mica and the like.

(e) Softening agent or plasticizer other than the high aromatic oil of 50% by weight, preferably 45% by weight less in terms of the total weight of the high aromatic oil of the present invention plus the softening agent or plasticizer, based on the whole weight of the rubber composition of the present invention.

(f) Waxes and antioxidants for preventing degradation (g) Other optional components, for example, compounding agents usually used in the rubber industry, including, for example, tackifiers, vulcanization controlling agents, high loss-providing agents and low loss-providing agents.

The rubber composition of the present invention is obtained in the form of a mixture comprising components (a) to (c) described above, the improved high aromatic oil and optional components (d) to (g) described above. Further, the rubber composition of the present invention is used usually in the form of various rubber products by heating.

EXAMPLES

The present invention shall be explained below in further detail with reference to examples and comparative examples but the present invention shall by no means be restricted by these examples.

(1) Production and Evaluation of the High Aromatic Oils (Examples 1 to 14 and Comparative Examples 1 to 7)

The high aromatic oils were prepared under the refining conditions of the respective refining methods (processes 1 to 13 and A to E described above) shown in the following tables 1 to 3. The characteristics (a glass transition point Tg, an aromatic component, a saturated component, Ca (aromatic carbon), Cn (naphthene ring carbon), Cp (paraffin chain carbon), a kinetic viscosity, an aniline point, a density, a volatile matter and a DMSO extract amount) of the high aromatic oil thus prepared are shown in the following tables 1 to 3.

As for the hydrogenation conditions shown in the following tables 1 to 3, cracking means hydrocracking treatment for selectively cracking PCA, and the conditions thereof are a reaction temperature of 300 to 420° C., a pressure of 7.8 to 20 Mpa, a liquid space velocity of 0.5 to 2.5 kl-oil/m$^3$-catalyst and a hydrogen circulation amount of 350 to 710 Nm$^3$/kl-oil.

The conditions of the hydrogenation finishing treatment are a reaction temperature of 280 to 360° C., a pressure of 5.4 to 12 Mpa, a liquid space velocity of 0.5 to 2.5 kl-oil/m$^3$-catalyst and a hydrogen circulation amount of 50 to 350 Nm$^3$/kl-oil.

As for the conditions of the solvent extraction treatment shown in the following tables 1 to 3, the term "mild" means a solvent extraction condition for obtaining a raffinate having a high aromatic content and a low PCA content, wherein a solvent used is furfural; a solvent ratio (ratio of the solvent used to a feed oil) is 1.0 to 3.0; and extraction temperatures are 80 to 110° C. at the column top and 40 to 70° C. at the bottom.

The term "severe" means a solvent extraction condition for obtaining an extract having a high aromatic content, wherein a solvent used is furfural; a solvent ratio is 3.0 to 6.0; and extraction temperatures are 100 to 130° C. at the column top and 60 to 90° C. at the bottom.

As for FEED shown in the following tables 1 to 3, VD means a vacuum distillation distillate. VR means a vacuum distillation residual oil. DAE means a solvent extract of VD. RAE means a solvent extract of VR subjected to deasphalting treatment.

The glass transition point Tg, the aromatic component, the saturated component, Ca, Cn and Cp measured by Kurtz analysis, the kinetic viscosity, the aniline point, the density, the volatile matter and the DMSO extract amount of the high aromatic oil were measured and evaluated by the following methods, respectively.

The glass transition point Tg was measured by a DSC method.

The aromatic component and the saturated component were measured by a Clay-Gel method (ASTM D2007). The Clay Gel method is a test procedure for classifying oil samples of initial boiling point of at least 260° C.

Ca (aromatic carbon), Cn (naphthene ring carbon) and Cp (paraffin chain carbon) were measured according to ASTM D2140 (Kurtz analysis).

The kinetic viscosity was measured by JIS K 2283 [revised on Mar. 1, 1993 (ISO 2909, 3104, 3105)].

The aniline point was measured by JIS K 2256 [revised on Nov. 1, 1985 (ISO 2977)].

The density was measured by JIS K 2249 [revised on Mar. 1, 1987 (ISO 91/1, 649/1, 3675, 3838)].

The volatile matter was measured by JIS K 2207 [revised on Aug. 1, 1990 (ASTM D6)].

The DMSO extract amount was measured by an IP 346 method.

TABLE 1

Characteristics of Resulting High Aromatic Oils

| | Example | | | | | | |
|---|---|---|---|---|---|---|---|
| | 1 | 2 | 3 | 4 | 5 | 6 | 7 |
| Tg (glass transition point-DSC method) | −42.53 | −40.74 | −42.07 | −43.02 | −29.55 | −28.62 | −38.75 |
| Clay-Gel analysis (ASTM D2007) | | | | | | | |
| Aromatic component (wt %) | 55.7 | 59.6 | 55.1 | 53.5 | 65.2 | 76.60 | 80.40 |
| Saturated component (wt %) | 39.8 | 35.5 | 40 | 40 | 24.7 | 14.40 | 12.10 |
| Kurtz analysis | | | | | | | |
| Ca | 26.00 | 28.50 | 25.5 | 23.5 | 30.5 | 33.50 | 38.50 |
| Cn | 28.00 | 27.50 | 26.5 | 27 | 28.5 | 30.00 | 30.00 |
| Cp | 47.00 | 44.00 | 48 | 49.5 | 42 | 36.50 | 31.50 |
| Kinetic viscosity (100° C.) | 21.03 | 23.05 | 48.86 | 46.25 | 26.51 | 37.50 | 17.50 |
| Aniline point (° C.) | 85 | 82.5 | 86 | 87.2 | 81 | 56.0 | 48.0 |
| Density (15° C.) | 0.9012 | 0.9136 | 0.9435 | 0.9322 | 0.9451 | 0.9809 | 0.9651 |
| Volatile matter | 0.10 | 0.09 | 0.04 | 0.05 | 0.10 | 0.01 | 0.03 |
| DMSO extract (wt %) | 2.36 | 2.48 | 2.56 | 2.42 | 1.98 | 2.64 | 2.70 |
| Refining method | Process 1 | Process 2 | Process 3 | Process 4 | Process 5 | Process 6 | Process 6 |
| Refining conditions | | | | | | | |
| FEED | DAE + NT | DAE + NT | RAE + NT | RAE + NT | VD | VD | VD |
| Deasphalting | — | — | — | — | — | — | — |
| Hydrogenation dewaxing | — | — | — | — | — | — | — |
| Extraction 1 | — | — | — | — | Severe | Severe | Severe |
| Extraction 2 | — | — | — | — | — | Mild | Mild |
| Hydrogenation | Cracking | Finish | Finish | Cracking | Cracking | (Finish) | (Finish) |
| Solvent dewaxing | — | — | — | — | — | — | — |

Treatment shown in a parenthesis of the table is not essential and carried out if necessary.

TABLE 2

Characteristics of Resulting High Aromatic Oils (continued from Table 1)

| | Example | | | | | | |
|---|---|---|---|---|---|---|---|
| | 8 | 9 | 10 | 11 | 12 | 13 | 14 |
| Tg (glass transition point-DSC method) | −33.57 | −35.62 | −36.50 | −34.78 | −31.44 | −33.66 | −37.07 |
| Clay-Gel analysis (ASTM D2007) | | | | | | | |
| Aromatic component (wt %) | 71.50 | 66.80 | 66.20 | 65.30 | 69.30 | 68.20 | 66.50 |
| Saturated component (wt %) | 17.20 | 18.20 | 23.10 | 21.60 | 17.60 | 18.70 | 22.30 |
| Kurtz analysis | | | | | | | |
| Ca | 34.50 | 31.50 | 30.00 | 32.00 | 36.00 | 34.00 | 30.50 |
| Cn | 32.00 | 30.50 | 26.00 | 28.50 | 33.00 | 28.00 | 26.00 |
| Cp | 33.50 | 38.00 | 44.00 | 39.50 | 31.00 | 38.00 | 43.50 |
| Kinetic viscosity (100° C.) | 30.46 | 27.78 | 47.60 | 57.41 | 51.65 | 62.50 | 45.23 |
| Aniline point (° C.) | 60.5 | 67.0 | 84.0 | 75.0 | 58.0 | 63.0 | 82.5 |
| Density (15° C.) | 0.9341 | 0.9223 | 0.9467 | 0.9696 | 0.9821 | 0.978 | 0.9432 |
| Volatile matter | 0.04 | 0.10 | 0.06 | 0.04 | 0.01 | 0.01 | 0.07 |
| DMSO extract (wt %) | 2.11 | 1.80 | 1.92 | 2.32 | 2.56 | 2.01 | 1.85 |
| Refining method | Process 7 | Process 8 | Process 9 | Process 10 | Process 11 | Process 12 | Process 13 |
| Refining conditions | | | | | | | |
| FEED | VD | VD | VR | VR | VR | VR | VR |
| Deasphalting | — | — | Ordinary | Ordinary | Ordinary | Ordinary | — |
| Hydrogenation dewaxing | Ordinary | — | — | — | Ordinary | — | — |
| Extraction 1 | Mild | Mild | Severe | Severe | Mild | Mild | Mild |
| Extraction 2 | — | — | — | Mild | — | — | — |
| Hydrogenation | — | Finish | Finish | (Finish) | — | — | Cracking |
| Solvent dewaxing | — | Ordinary | — | — | — | Ordinary | — |

Treatment shown in a parenthesis of the table is not essential and carried out if necessary.

TABLE 3

Characteristics of Resulting High Aromatic Oils
(continued from Table 1)

|  | Comparative Example | | | | | | |
|---|---|---|---|---|---|---|---|
|  | 1 | 2 | 3 | 4 | 5 | 6 | 7 |
| Tg (glass transition point-DSC method) | −29.68 | −35.44 | −43.07 | −19.68 | −89.50 | −51.55 | −49.76 |
| Clay-Gel analysis (ASTM D2007) | | | | | | | |
| Aromatic component (wt %) | 77.98 | 86.69 | 68.32 | 95.33 | 37.55 | 17.29 | 17.74 |
| Saturated component (wt %) | 17.53 | 9.10 | 26.35 | 2.30 | 61.15 | 82.15 | 81.45 |
| Kurtz analysis | | | | | | | |
| Ca | 42.50 | 43.50 | 39.50 | 58.50 | 11.50 | 7.50 | 11.75 |
| Cn | 28.00 | 28.00 | 26.50 | 13.50 | 27.50 | 26.50 | 28.40 |
| Cp | 29.50 | 28.50 | 34.00 | 28.00 | 61.00 | 66.00 | 59.65 |
| Kinetic viscosity (100° C.) | 63.78 | 24.48 | 28.90 | 63.32 | 4.47 | 46.96 | 62.38 |
| Aniline point (° C.) | 38.6 | 30.5 | 49.1 | 57.4 | 87.5 | 127.4 | 125.2 |
| Density (15° C.) | 0.9835 | 0.9774 | 0.9960 | 1.0021 | 0.8496 | 0.9058 | 0.9185 |
| Volatile matter | 0.01 | 0.08 | 0.07 | 0.01 | 1.17 | 0.01 | 0.01 |
| DMSO extract (wt %) | 13.49 | 16.82 | 14.56 | 2.89 | 0.66 | 0.66 | 4.27 |
| Refining method | Process A | Process A | Process B | Process C | Process A | Process D | Process E |
| Refining conditions | | | | | | | |
| FEED | VD | VD | DAE + NT | RAE | VD | VR | VR |
| Deasphalting | — | — | — | — | — | Ordinary | Ordinary |
| Hydrogenation dewaxing | — | — | — | — | — | — | — |
| Extraction 1 | Severe | Severe | — | * | Severe | Mild | Mild |
| Extraction 2 | — | — | — | — | — | — | — |
| Hydrogenation | — | — | — | — | — | — | — |
| Solvent dewaxing | — | — | — | — | Ordinary | Ordinary | Ordinary |

Treatment shown in a parenthesis of the table is not essential and carried out if necessary.
*Sample obtained by further repeating solvent extraction of RAE of Process 13

(2) Production and Evaluation of the Oil Extended Synthetic Rubbers (Examples A to E and Comparative Examples A to E)

The results obtained by evaluating the drying workabilities, the bale-preparing difficulties and the handling workabilities of the oil-extended synthetic rubbers using the high aromatic oils of the present invention and the like as an extender oil are shown in the following tables 4 and 5.

The oil extended synthetic rubbers were prepared according to the following polymerization processes 1 and 2 and to the recipe shown in the following tables 4 and 5. Further, the drying workability, the bale-preparing difficulty and the handling workability were evaluated by the following methods.

Polymerization Process 1:

A pressure reactor of 5 liters was charged with 1200 g of dried cyclohexane, 80 g of styrene and 120 g of butadiene, and the temperature of the content was adjusted to 50° C. Further, 60 mmol of tetrahydrofuran was charged as a randomizer, and then 1.6 mmol of a 1.6 N n-hexane solution of n-BuLi was added as an initiator. Subsequently, the polymerization was carried out at 50° C. for 2 hours.

After finishing the polymerization, a solution obtained by dissolving 0.5 g of BHT in 5 ml of isopropanol was added to the polymerization system to stop the polymerization. After stopping the polymerization, the high aromatic oil shown in Table 1 was added, and then the content was dried by a conventional method to obtain an oil extended synthetic rubber.

Polymerization Process 2:

The pressure reactor of 5 liters was charged with 1200 g of dried cyclohexane, 80 g of styrene and 120 g of butadiene, and the temperature of the content was adjusted to 50° C. Further, 50 mmol of tetrahydrofuran was charged as a randomizer, and then 1.2 mmol of a 1.6 N n-hexane solution of n-BuLi was added as an initiator. Subsequently, the polymerization was carried out at 50° C. for 2 hours.

After finishing the polymerization, 1 mmol of 1 N (SiCl$_4$/c-Hexane) was added to the polymerization system to carry out a coupling reaction at 50° C. for 30 minutes. After finishing the reaction, a solution obtained by dissolving 0.5 g of BHT in 5 ml of isopropanol was added to the polymerization system to stop the polymerization. After stopping the polymerization, the high aromatic oil shown in Table 1 was added, and then the content was dried by a conventional method to obtain an oil extended synthetic rubber.

Evaluation of Drying Workability:

For the evaluation of the drying workability, a sample (1 cm×1 cm×1 cm, the same shall apply hereinafter) which was dried in an oven at 100° C. for one hour was used, and the temperature of the sample was elevated by means of TGA (thermal analyzer) to measur an evaporation loss. The evaporation loss of 1% or less is regarded as good.

Evaluation of Bale-Preparing Difficulty:

The bale-preparing difficulty was evaluated by whether or not a bale was formed when a sample was put in an iron-made vessel of 10 cm×10 cm×10 cm to carry out molding at 1 Mpa for one hour by means of a vertical press.

Evaluation of Handling Workability:

The handling workability was evaluated by preparing five of the same samples to evaluate the workability thereof.

TABLE 4

Test Results of Oil Extended Synthetic Rubber

|  | Comparative Example A | Example A | Example B | Comparative Example C |
|---|---|---|---|---|
| Polymerization method | Process 1 | Process 1 | Process 1 | Process 1 |
| Mw | 240000 | 240000 | 240000 | 240000 |
| Styrene % | 40.1 | 40.1 | 40.1 | 40.1 |
| Butadiene % | 37.0 | 37 | 37 | 37 |
| High aromatic oil used | None | Example 2 | Example 2 | Example 2 |
| Use amount (PHR) | None | 27.3 | 37.5 | 54.5 |
| Drying workability | Good | Good | Good | Difficult |
| Bale preparing difficulty | Good | Good | Good | Adhered |
| Handling workability | Good | Good | Good | Extra bad |

TABLE 5

Test Results of Oil Extended Synthetic Rubber (continued from Table 4)

|  | Comparative Example B | Example C | Example D | Example E | Comparative Example D | Comparative Example E |
|---|---|---|---|---|---|---|
| Polymerization method | Process 2 | Process 2 | Process 2 | Process 2 | Process 2 | Process 2 |
| Mw | 1450000 | 1450000 | 1450000 | 1450000 | 1450000 | 1450000 |
| Styrene % | 40.2 | 40.2 | 40.2 | 40.2 | 40.2 | 40.2 |
| Butadiene % | 36.0 | 36 | 36 | 36 | 36 | 36 |
| High aromatic oil used | None | Example 2 | Example 2 | Example 2 | Example 2 | Example 2 |
| Use amount (PHR) | None | 27.3 | 37.5 | 27.3 | 2.0 | 54.5 |
| Drying workability | Very bad | Good | Good | Good | Difficult | Difficult |
| Bale preparing difficulty | No | Good | Good | Good | No | Adhered |
| Handling workability | Extra bad | Good | Good | Good | Extra bad | Extra bad |

Consideration of Table 4 and Table 5:

As apparent from the results shown in Tables 4 and 5, it has become clear that the oil extended synthetic rubbers which are excellent in a drying workability, a bale preparing difficulty and a handling workability as compared with those in Comparative Examples A to E falling outside the scope of the present invention are obtained in Examples A to E falling within the scope of the present invention.

(3) Application to Rubber Composition

Rubber compositions were prepared in accordance with the compounding recipe shown in the following table 6 and tables 7 to 9, and the test pieces were prepared by the following method to evaluate a rupture characteristic, a modulus of elasticity at a low temperature, a softening performance, a loss characteristic (tan δ), an modulus of elasticity at 300% elongation (room temperature) and an oil bleed property in terms of the rubber characteristics and judge a DMSO extract amount (PCA) in terms of the safety. The results are shown in the following table 6 and tables 7 to 9.

[1] Preparing Method of Test Pieces

Raw materials for a master batch having the compounding recipe shown in the following table 6 were mixed by means of a kneader and then formed into a sheet by means of a roll having a surface temperature of 70° C. Subsequently, this master batch and raw materials for a final were blended by means of the kneader and then formed into a sheet by means of a roll having a surface temperature of 70° C. Then, this was filled into a suitable die and vulcanized under the conditions of a temperature of 160° C., a pressure of 3.0 Mpa and a heating period of 15 minutes. Then, it was taken out of the die to prepare a prescribed test piece.

[2] Test Method of Rubber Composition (a) Test Method of Measuring Rupture Characteristic:

A test piece of No. JIS-3 was prepared from a vulcanized rubber sheet (150 mm×150 mm×2 mm) prepared in accordance with the compounding recipe 1 shown in the following table 6 according to JIS K6301.

This test piece was used to measur a tensile strength (rupture strength) at the time of breaking by means of a tensile tester (Strograph AR-1 manufactured by Toyo Seiki Co., Ltd.).

(b) Test Method of Measuring Modulus of Elasticity at a Low Temperature:

A vulcanized rubber sheet (150 mm×150 mm×2 mm) prepared in accordance with the compounding recipe 1 shown in the following table 6 was used to measur a dynamic modulus of elasticity at −20° C. by means of a visco-elasticity tester (Rheolograph Solid, model L-1R manufactured by Toyo Seiki Co., Ltd.). The term "E+07" means "×10$^7$".

(c) Test Method of Measuring Softening Performance:

A sample of non-vulcanized rubber prepared in accordance with the compounding recipe 1 shown in the following table 6 was measured for ML1+4 by means of a Mooney viscosity measuring device.

(d) Test Method of Measuring Loss Characteristic (tan δ):

Measur at a bias of 1%, 52 Hz and 25° C. by means of a spectrometer.

(e) Test Method of Measuring a Modulus of Elasticity at 300% Elongation:

Measured according to JIS K 6301.

(f) Test Method of Measuring Oil Bleed Property:

A vulcanized rubber sheet (150 mm×150 mm×2 mm) prepared in accordance with the compounding recipe formation 2 shown in the following table 6 was left for standing for 48 hours at room temperature to evaluate the presence of oil bleed with visual observation. The absence of oil bleed was evaluated as "OK", and the presence of oil bleed was evaluated as "NG".

(g) Judgment of DMSO Extract Amount:

The DMSO extract amount of less than 3% by weight was evaluated as "OK", and that exceeding 3% by weight was evaluated as "NG".

TABLE 6

Compounding Recipe (blend unit: parts by weight)

| Stage | Material name | Material used | Maker | Recipe 1 | Recipe 2 |
|---|---|---|---|---|---|
| Master batch | SBR 1500 | JSR #1500 | Japan Synthetic Rubber | 100.00 | 100.00 |
| | N220 carbon | Tokai Seast 6 | Tokai Carbon | 60.00 | 75.00 |
| | Softening agent | Examples 1 to 14, Comparative Examples 1 to 7 | | 20.00 | 35.00 |
| Final | Stearic acid | BR-Stearic Acid | Nippon Oil & Fat | 1.50 | 1.50 |
| | Zinc oxide | Zinc white No. 1 | Hakusui Chemical | 3.00 | 3.00 |
| | Sulfur | Sulfur | Karuisawa Seirensho | 1.50 | 1.80 |
| | Vulcanization accelerator 1 | Nocceler DM | Ohuchi Shinko Chemical | 0.70 | 1.50 |
| | Vulcanization accelerator 2 | Nocceler NS | Ohuchi Shinko Chemical | 0.35 | 0.00 |
| | Vulcanization accelerator 3 | Nocceler DPG | Ohuchi Shinko Chemical | 0.60 | 0.80 |

TABLE 7

| | Example | | | | | | |
|---|---|---|---|---|---|---|---|
| | 1 | 2 | 3 | 4 | 5 | 6 | 7 |
| High aromatic oil | | | | | | | |
| $T_g$ (glass transition point-DSC method) | −42.53 | −40.74 | −42.07 | −43.02 | −29.55 | −28.62 | −38.75 |
| Clay-Gel analysis (ASTM D2007) | | | | | | | |
| Aromatic component (wt %) | 55.70 | 59.60 | 55.10 | 53.50 | 65.20 | 76.60 | 80.40 |
| Saturated component (wt %) | 39.80 | 35.50 | 40.00 | 40.00 | 24.70 | 14.40 | 12.10 |
| Kurtz analysis | | | | | | | |
| Ca | 26.00 | 28.50 | 25.50 | 23.50 | 30.50 | 33.50 | 38.50 |
| Cn | 28.00 | 27.50 | 26.50 | 27.00 | 28.50 | 30.00 | 30.00 |
| Cp | 47.00 | 44.00 | 48.00 | 49.50 | 42.00 | 36.50 | 31.50 |
| Kinetic viscosity (100° C.) | 21.03 | 23.05 | 48.86 | 46.25 | 26.51 | 37.50 | 17.50 |
| Aniline point (° C.) | 85.00 | 82.50 | 86.00 | 87.20 | 81.00 | 56.00 | 48.00 |
| Density (15° C.) | 0.9012 | 0.9136 | 0.9435 | 0.9322 | 0.9451 | 0.9809 | 0.9651 |
| Volatile matter | 3.1 | 2.7 | 1.2 | 1.6 | 3.1 | 1.60 | 2.70 |
| DMSO extract (wt %) | 2.36 | 2.48 | 2.56 | 2.42 | 1.98 | 2.64 | 2.70 |
| Evaluation | | | | | | | |
| Rubber characteristics | | | | | | | |
| Rupture characteristic/rupture strength | 20.45 | 20.55 | 20.79 | 20.72 | 20.47 | 21.42 | 21.49 |
| Low temperature characteristic/modulus of elasticity at low temperature | 4.89E+07 | 5.02E+07 | 5.58E+07 | 5.47E+07 | 5.13E+07 | 6.03E+07 | 5.58E+07 |
| Softening performance/ML1 + 4 | 49.15 | 49.43 | 50.02 | 49.83 | 50.78 | 51.42 | 49.82 |
| Loss characteristic/tan δ | 0.3164 | 0.3180 | 0.3261 | 0.3247 | 0.3180 | 0.3300 | 0.3244 |
| 300% modulus of elasticity (room temperature) | 8.17 | 8.14 | 7.89 | 7.92 | 7.93 | 7.82 | 8.05 |
| Oil bleed property | OK | OK | OK | OK | OK | OK | OK |
| Safety | | | | | | | |
| Judgment of DMSO extract amount | OK | OK | OK | OK | OK | OK | OK |

TABLE 8

| | Example | | | | | | |
|---|---|---|---|---|---|---|---|
| | 8 | 9 | 10 | 11 | 12 | 13 | 14 |
| High aromatic oil | | | | | | | |
| Tg (glass transition point-DSC method) | −33.57 | −35.62 | −36.50 | −34.78 | −31.44 | −33.66 | −37.07 |
| Clay-gel analysis (ASTM D2007) | | | | | | | |
| Aromatic component (wt %) | 71.50 | 66.80 | 66.20 | 65.30 | 69.30 | 68.20 | 66.50 |
| Saturated component (wt %) | 17.20 | 18.20 | 23.10 | 21.60 | 17.60 | 18.70 | 22.30 |
| Kurtz analysis | | | | | | | |
| Ca | 34.50 | 31.50 | 30.00 | 32.00 | 36.00 | 34.00 | 30.50 |
| Cn | 32.00 | 30.50 | 26.00 | 28.50 | 33.00 | 28.00 | 26.00 |
| Cp | 33.50 | 38.00 | 44.00 | 39.50 | 31.00 | 38.00 | 43.50 |
| Kinetic viscosity (100° C.) | 30.46 | 27.78 | 47.60 | 57.41 | 51.65 | 62.50 | 45.23 |
| Aniline point (° C.) | 60.5 | 67.0 | 84.0 | 75.0 | 58.0 | 63.0 | 82.5 |
| Density (15° C.) | 0.9341 | 0.9223 | 0.9467 | 0.9696 | 0.9821 | 0.9780 | 0.9432 |
| Volatile matter | 1.20 | 2.90 | 1.80 | 1.10 | 0.20 | 0.10 | 2.00 |
| DMSO extract (wt %) | 2.11 | 1.80 | 1.92 | 2.32 | 2.56 | 2.01 | 1.85 |
| Evaluation | | | | | | | |
| Rubber characteristics | | | | | | | |
| Rupture characteristic/rupture strength | 21.22 | 20.99 | 20.71 | 21.11 | 21.56 | 21.56 | 20.73 |
| Low temperature characteristic/modulus of elasticity at low temperature | 5.68E+07 | 5.43E+07 | 5.51E+07 | 6.00E+07 | 6.31E+07 | 6.43E+07 | 5.48E+07 |
| Softening performance/ML1 + 4 | 50.64 | 50.29 | 50.63 | 51.18 | 51.52 | 51.56 | 50.52 |
| Loss characteristic/tan δ | 0.3256 | 0.3224 | 0.3241 | 0.3306 | 0.3342 | 0.3363 | 0.3236 |
| 300% modulus of elasticity (room temperature) | 7.90 | 7.94 | 7.74 | 7.64 | 7.68 | 7.58 | 7.77 |
| Oil bleed property | OK | OK | OK | OK | OK | OK | OK |
| Safety | | | | | | | |
| Judgment of DMSO extract amount | OK | OK | OK | OK | OK | OK | OK |

TABLE 9

| | Conventional high aromatic oil Comparative Example | | | |
|---|---|---|---|---|
| | 1 | 2 | 3 | 6 |
| High aromatic oil | | | | |
| Tg (glass transition point-DSC method) | −29.68 | −35.44 | −43.07 | −51.55 |
| Clay-gel analysis (ASTM D2007) | | | | |
| Aromatic component (wt %) | 77.98 | 86.69 | 68.32 | 17.29 |
| Saturated component (wt %) | 17.53 | 9.10 | 26.35 | 82.15 |
| Kurtz analysis | | | | |
| Ca | 42.50 | 43.50 | 39.50 | 7.50 |
| Cn | 28.00 | 28.00 | 26.50 | 26.50 |
| Cp | 29.50 | 28.50 | 34.00 | 66.00 |
| Kinetic viscosity (100° C.) | 63.78 | 24.48 | 28.90 | 46.96 |
| Aniline point (° C.) | 38.6 | 30.50 | 49.10 | 127.34 |
| Density (15° C.) | 1.0184 | 1.0122 | 0.996 | 0.8975 |
| Volatile matter | 1.395 | 2.433 | 0.07 | 0.01 |
| DMSO extract (wt %) | 13.49 | 16.82 | 14.56 | 0.66 |
| Evaluation | | | | |
| Rubber characteristics | | | | |
| Rupture characteristic/rupture strength | 22.01 | 21.91 | 21.40 | 19.57 |
| Low temperature characteristic/modulus of elasticity at low temperature | 6.49E+07 | 5.80E+07 | 5.34E+07 | 4.56E+07 |
| Softening performance/ML1 + 4 | 52.17 | 50.67 | 49.81 | 48.55 |
| Loss characteristic/tan δ | 0.3346 | 0.3254 | 0.3200 | 0.3047 |
| 300% modulus of elasticity (room temperature) | 7.22 | 7.57 | 7.56 | 8.07 |
| Oil bleed property | OK | OK | OK | NG |
| Safety | | | | |
| Judgment of DMSO extract amount | NG | NG | NG | OK |

Consideration of Tables 7 to 9 and FIG. 2 to FIG. 7:

Tables 7 to 9 described above are to show a comparison of conventional high aromatic oils with the high aromatic oils of the present invention. As apparent from the results shown in Tables 7 to 9, it has become clear that since the high aromatic oils prepared in Examples 1 to 14 falling within the scope of the present invention have a DMSO extract amount of 3% or less, they have an excellent safety and are endowed with the performances which are equal to those of the conventional high aromatic lubricants (aroma oils) prepared in Comparative Examples 1 to 3 and that the excellent rubber properties thereof as a softening agent for a rubber composition are compatible with the safety.

In particular, prepared in Comparative Example 6 is a high aromatic oil containing PCA of less than 3% by weight falling within the range described in Japanese Patent Application Disclosure No. Hei 6-505524 [British Patent (GB) 2252978, U.S. Pat. No. 5,504,135 and European Patent (EP) 575400], wherein the kinetic viscosity is 32 to 50; the aromatic component accounts for 30 to 55% by weight; and the saturated component accounts for 40% by weight or more. As described above, it has become clear that the rubber characteristics related to the loss performance and the rupture characteristic are deteriorated.

Further, in Comparative Example 6 in which the highly aromatic oil containing the saturated component exceeding 40% by weight and, as described above, falling within the range described in Japanese Patent Application Disclosure No. Hei 6-505524 is used, it has become clear that the saturated component exceeding 40% by weight deteriorates the rupture characteristic and bring about oil bleed.

Figure 2:
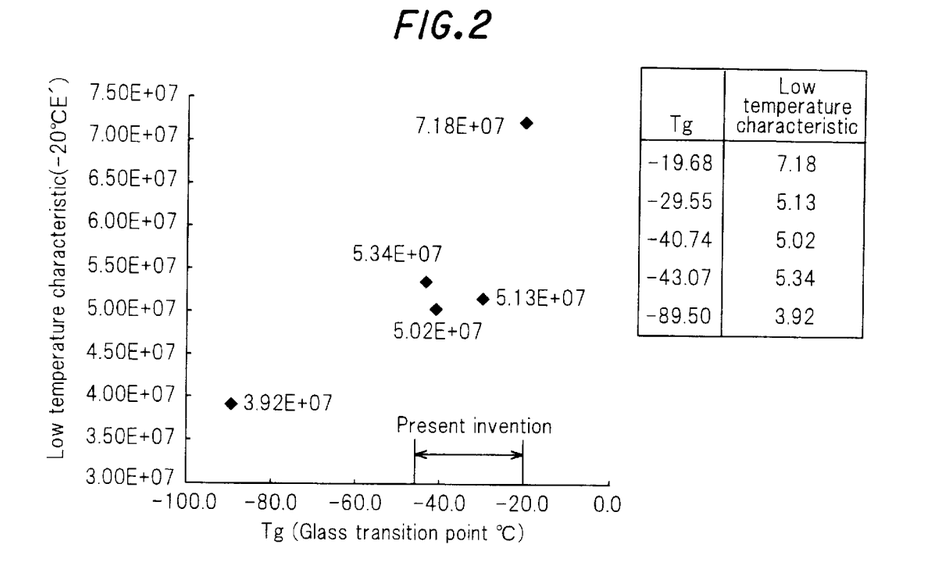
FIG. 2 is a characteristic diagram showing a relation of a glass transition point (Tg) with a low temperature characteristic of a high aromatic oil.
Figure 3:
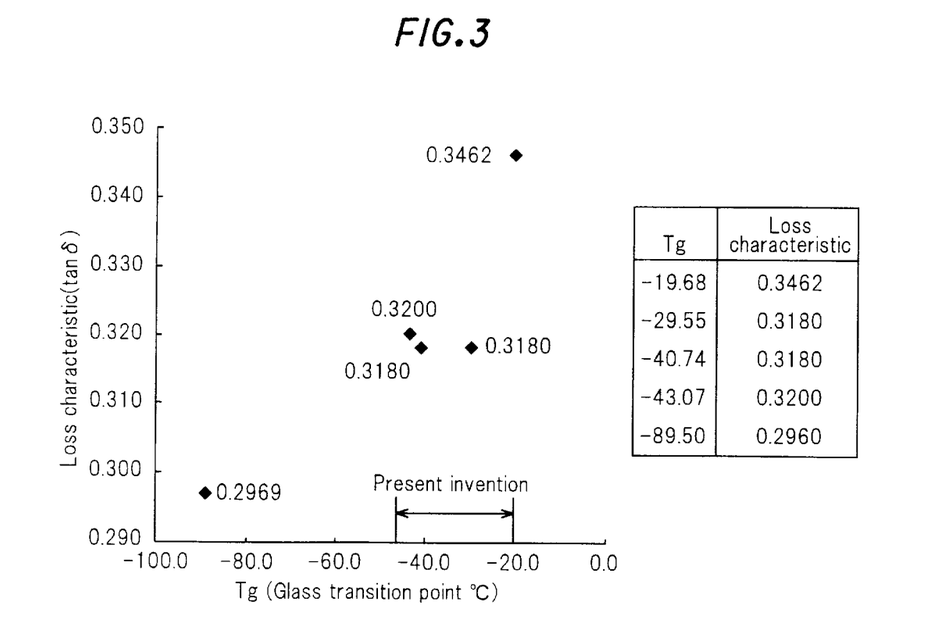
FIG. 3 is a characteristic diagram showing a relation of a glass transition point (Tg) with a loss characteristic of a high aromatic oil.

FIG. 2 and FIG. 3 are to show a comparison of high aromatic oils having glass transition points of −45° C. or lower and of −20° C. or higher with the high aromatic oils of the present invention. As apparent from the results shown in FIG. 2 and FIG. 3, it has become clear that the Tg of −20° C. or higher raises the modulus of elasticity to notably deteriorate the low temperature characteristic and the Tg of −45° C. or lower does not provide the sufficiently high loss performance but changes the modulus of elasticity largely from those of conventional products and deteriorates the oil bleed property.

Figure 4:
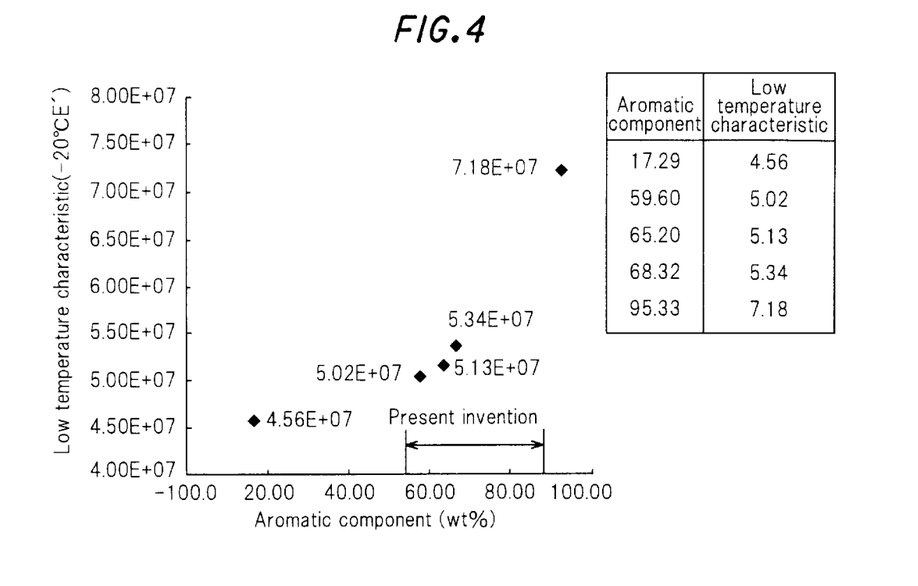
FIG. 4 is a characteristic diagram showing a relation of an aromatic component with a low temperature characteristic of a high aromatic oil.
Figure 5:
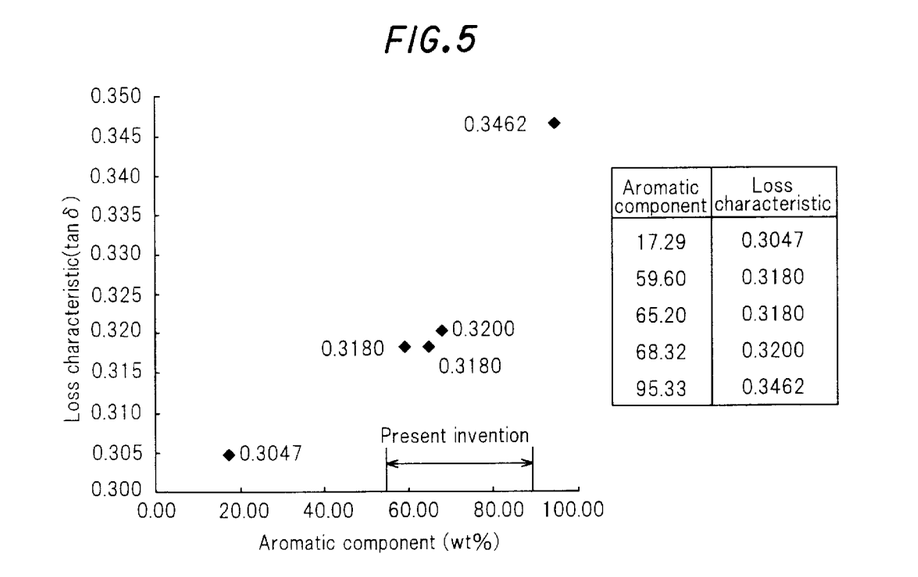
FIG. 5 is a characteristic diagram showing a relation of an aromatic component with a loss characteristic of a high aromatic oil.
Figure 6:
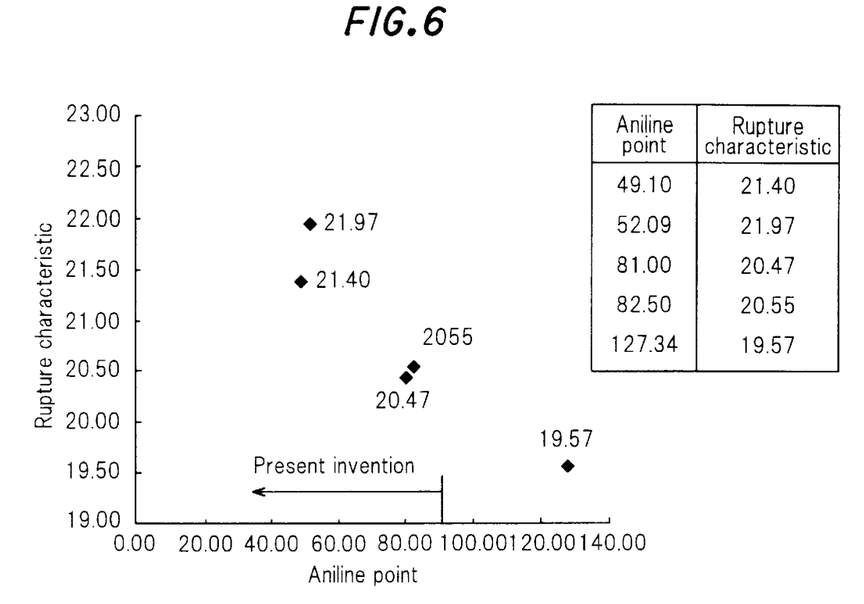
FIG. 6 is a characteristic diagram showing a relation of an aniline point with a rupture characteristic of a high aromatic oil.

Further, as apparent from the results shown in FIG. 4 and FIG. 5, it has become clear that the aromatic component exceeding 90% by weight makes it impossible to maintain the low temperature characteristic, and the aromatic component of less than 55% by weight deteriorates the loss performance. Further, it has become clear from FIG. 6 that the aniline point of 97 or more deteriorates the rupture characteristic.

Figure 7:
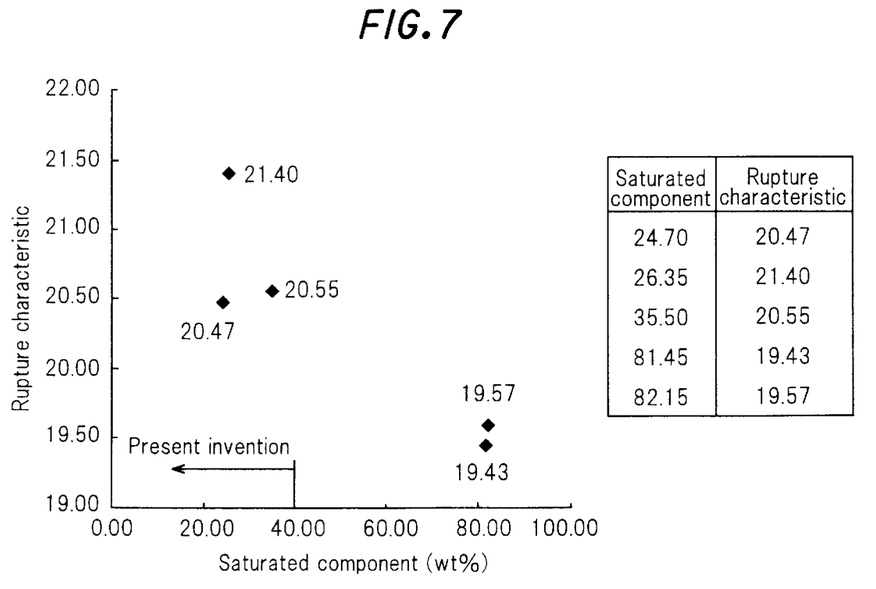
FIG. 7 is a characteristic diagram showing a relation of a saturated component with a rupture characteristic of a high aromatic oil.

FIG. 7 is to show a comparison of a high aromatic oil having a saturated component of 40% by weight or more with the high aromatic oil of the present invention. As apparent from the results shown in FIG. 7, it has become clear that the saturated component exceeding 40% by weight deteriorates the rupture characteristic and brings about oil bleed.

Considering the above results altogether, it has become clear that only the high aromatic oils having a glass transition point and an aromatic component each falling within the scope of the present invention, prepared in Examples 1 to 14, can have the rubber performances to be compatible with the excellent safety.

INDUSTRIAL APPLICABILITY

As described above, the high aromatic oil of the present invention has excellent safety and the equal performances as compared with conventional high aromatic softening agents for rubber, and an oil extended synthetic rubber using the above high aromatic oil as an extender oil and a rubber composition using the same as a softening agent can have the performances to be compatible with the excellent safety. Further, if the refining method recommended in the present invention is employed, the profitability can be satisfied as well.

Further, the high aromatic oil of the present invention can safely be used for all conventional uses of high aromatic oils such as oils for printing inks and writing inks as well as softening agents for rubber and extender oils for synthetic rubber.

What is claimed is:

1. A high aromatic oil having a glass transition point of from −42 to −20° C. and a boiling point of at least 260° C., and comprising 60–85% by weight aromatic component measure by Clay-Gel method, based on the total weight the hydrocarbons contained in the oil, and less than 3% by weight polycyclic aromatic compound measured by IP 346 method, based on the total weight of the hydrocarbons contained in the oil.

2. The high aromatic oil as described in claim 1, wherein the high aromatic oil has an aniline point of 97 or less.

3. The high aromatic oil as described in claim 1, wherein the amount of saturated hydrocarbon component measured by Clay-Gel method is 40% by weight or less based on the total weight of the hydrocarbons contained in the oil.

4. A rubber composition prepared by blending the high aromatic oil as described in claim 1 into a rubber component comprising natural rubber and/or synthetic rubber, wherein said high aromatic oil is blended in a proportion of 0.2 to 50% by weight based on the total weight of the rubber composition.

5. An oil extended synthetic rubber prepared by adding the high aromatic oil as described in claim 1 to a solution or a dispersion of synthetic rubber, wherein said high aromatic oil is added in a proportion of 5 to 50% by weight based on the total weight of the synthetic rubber.

6. A rubber composition comprising a rubber component selected from the group consisting of natural rubber and synthetic rubber and 0.2 to 50% by weight high aromatic oil as described in claim 1, based on the total weight of the rubber composition.

7. The rubber composition as claimed in claim 6, wherein the rubber component comprises synthetic rubber.

8. The rubber composition as claimed in claim 6, wherein the weight % high aromatic oil is 5 to 50% based on the total weight of the rubber composition.

* * * * *